(12) United States Patent
Tachibana et al.

(10) Patent No.: US 11,531,140 B2
(45) Date of Patent: Dec. 20, 2022

(54) OPTICAL LAMINATE HAVING ANTIREFLECTION FILM AND LIGHT SHIELDING FILM

(71) Applicant: AGC Inc., Chiyoda-ku (JP)

(72) Inventors: Yuko Tachibana, Tokyo (JP); Keisuke Matsuda, Tokyo (JP); Takaaki Murakami, Tokyo (JP); Toshinari Watanabe, Tokyo (JP); Tomoyuki Kobayashi, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 638 days.

(21) Appl. No.: 16/440,278

(22) Filed: Jun. 13, 2019

(65) Prior Publication Data

US 2019/0383971 A1 Dec. 19, 2019

(30) Foreign Application Priority Data

Jun. 13, 2018 (JP) .............................. JP2018-113157

(51) Int. Cl.
*G02B 1/11* (2015.01)
*G02B 1/14* (2015.01)
(Continued)

(52) U.S. Cl.
CPC .................. *G02B 1/11* (2013.01); *G02B 1/14* (2015.01); *G02B 1/115* (2013.01); *G02B 5/0294* (2013.01); *G02B 27/0983* (2013.01)

(58) Field of Classification Search
CPC .............. G02B 1/11–14; G02B 5/0294; G02B 27/0983; G02F 1/133502–133512; G02F 2201/38
See application file for complete search history.

(56) References Cited

U.S. PATENT DOCUMENTS 6,248,448 B1 * 6/2001 Lippey ................... G02B 1/113
428/432
9,817,167 B2 * 11/2017 Shin ..................... G02B 5/3083
(Continued)

FOREIGN PATENT DOCUMENTS

JP      2016-80857 A      5/2016
JP      2017-194489 A     10/2017
(Continued)

*Primary Examiner* — Ryan S Dunning
(74) *Attorney, Agent, or Firm* — Oblon, McClelland, Maier & Neustadt, L.L.P.

(57) ABSTRACT

The object of the present invention is to provide an optical laminate capable of reducing reflectance not only with respect to light incident vertically but also light incident obliquely, and further capable of obtaining a neutral reflected color tone even when light is incident obliquely. The optical laminate includes a base material, an antireflection film provided on one surface of the base material, and a light shielding film provided on the other surface of the base material. The optical laminate satisfies all of the following characteristics (i) to (iii):

$0.5 < R(\lambda_{1a}, \theta_{1a})/R(\lambda_{1b}, \theta_{1b}) < 1.5;$ (i)

$Y(\theta_2) \leq 3\%;$ and (ii)

$Y(\theta_3) \leq 10\%;$ (iii)

in which R ($\lambda$, $\theta$) designates reflectance when light of a wavelength of $\lambda$ nm is incident at an angle of $\theta$, provided that $\lambda_{1a} = 380$ nm, $\theta_{1a} = 60°$ and $\lambda_{1b} = 650$ nm, $\theta_{1b} = 60°$; and Y ($\theta$) designates luminous reflectance at an incident angle of $\theta$, provided that $\theta_2 = 5°$ and $\theta_3 = 60°$.

14 Claims, 3 Drawing Sheets

(51) Int. Cl.
*G02B 27/09* (2006.01)
*G02B 5/02* (2006.01)
*G02B 1/115* (2015.01)

(56) References Cited

U.S. PATENT DOCUMENTS

| | | | |
|---|---|---|---|
| 9,955,087 B1* | 4/2018 | Ma | H01L 31/1085 |
| 10,354,366 B2* | 7/2019 | Toda | H04N 9/0451 |
| 2003/0086159 A1* | 5/2003 | Suzuki | G02B 1/111 |
| | | | 359/885 |
| 2007/0195417 A1* | 8/2007 | Yamamoto | H04N 9/3114 |
| | | | 359/590 |
| 2012/0268695 A1* | 10/2012 | Walther | B32B 17/10036 |
| | | | 349/96 |
| 2018/0136367 A1 | 5/2018 | Fujii | |
| 2019/0107649 A1 | 4/2019 | Ikegami et al. | |
| 2019/0219739 A1* | 7/2019 | Gregorski | C03C 17/3452 |

FOREIGN PATENT DOCUMENTS

| | | |
|---|---|---|
| JP | 2017-206392 | 11/2017 |
| JP | 2018-83748 A | 5/2018 |

* cited by examiner

OPTICAL LAMINATE HAVING ANTIREFLECTION FILM AND LIGHT SHIELDING FILM

TECHNICAL FIELD

The present invention relates to an optical laminate.

BACKGROUND ART

In an image display device (such as a liquid crystal display, an organic EL display, a plasma display, etc.) provided in a smartphone, a cellular phone, an instrument panel of a vehicle, etc., visibility deteriorates due to a reflected image when indoor lighting or external light such as sunlight is reflected on a display surface.

A method in which an antireflection film is disposed on the display surface side of an image display device to reduce reflection of incident light thereby making a reflected image unclear has been known as a method for reducing reflection of external light. A single layer film composed of a low refractive index material, or a multilayer film in which layers of a low refractive index material and layers of a high refractive index material are combined has been known as the antireflection film (for example, Patent Document 1).

[Patent Document 1] JP-A-2017-206392

SUMMARY OF INVENTION

Problem that the Invention is to Solve

However, such a background-art antireflection film is designed based on an optical path length with respect to a vertical incident angle. Therefore, the optical path length may be displaced from the design in accordance with the incident angle of external light or the position of a person who watches an image. Thus, reflectance may increase greatly enough to impair the effect of reducing reflection, while the reflection may be visually recognized with a change of a reflected color tone. Further, when there is a curved surface portion in a base material, there is a problem that the reflection may be visually recognized as a difference in reflected color tone between a flat portion and the curved surface portion.

An object of the present invention to provide an optical laminate capable of reducing reflectance not only with respect to light incident vertically but also with respect to light incident obliquely, and further capable of obtaining a neutral reflected color tone even when light is incident obliquely.

Means to Solve the Problem

The present invention found that the foregoing problems could be solved by the following optical laminate.

[1] An optical laminate including a base material, an antireflection film that is provided on one surface of the base material, and a light shielding film that is provided on the other surface of the base material, wherein the optical laminate satisfies all of the following characteristics (i) to (iii):

$$0.5 < R(\lambda_{1a},\theta_{1a})/R(\lambda_{1b},\theta_{1b}) < 1.5; \qquad (i)$$

$$Y(\theta_2) \leq 3\%; \text{ and} \qquad (ii)$$

$$Y(\theta_3) \leq 10\%; \qquad (iii)$$

in which $R(\lambda, \theta)$ designates reflectance when light of a wavelength of $\lambda$ nm is incident at an angle of $\theta$, provided that:

$\lambda_{1a}=380$ nm, $\theta_{1a}=60°$;
$\lambda_{1b}=650$ nm, $\theta_{1b}=60°$; and $Y(\theta)$ designates luminous reflectance at an incident angle of $\theta$, provided that:

$\theta_2=5°$; and $\theta_3=60°$.

[2] The optical laminate according to [1] further satisfying the following characteristic (iv):

$$0.3 < R(\lambda_{2a},\theta_{2a})/R(\lambda_{2b},\theta_{2b}) < 1.3 (\theta_{2a}=\theta_{2b}=5°); \qquad (iv)$$

in which $\lambda_{2a}$ is within a wavelength region of from 400 nm to 450 nm, and $\lambda_{2b}$ is within a wavelength region of from 700 nm to 790 nm

[3] The optical laminate according to [1] or [2] further satisfying the following characteristic (v):

$$R(\lambda_{3a},\theta_{3a}) < 2\%; \qquad (v)$$

in which $R(\lambda, \theta)$ designates reflectance when light of a wavelength of $\lambda$ nm is incident at an angle of $\theta$, provided that $\lambda_{3a}=500$ nm, and $\theta_{3a}=5°$.

[4] The optical laminate according to any one of [1] to [3], in which the optical laminate has a region satisfying T(850 nm, 0°)>60% in a region where the light shielding film is provided;

in which T (850 nm, 0°) designates transmittance when light of a wavelength of 850 nm is incident at an angle of 0°.

[5] The optical laminate according to any one [1] to [4], in which;

the light shielding film includes an infrared transmission region; and the light shielding film in contact with the base material satisfies the following conditions (a) and (b):

(a) $0.8 \times n_B \leq n_A \leq 1.2 \times n_B$ and $0.1 \times k_B \leq k_A \leq 1.8 \times k_B$ at a wavelength of 450 to 650 nm; and (b) $k_A \leq 0.2$ at a wavelength of 850 nm, in which $n_A$ designates a refractive index of the light shielding film in contact with the base material in the infrared transmission region;

$k_A$ designates an extinction coefficient of the light shielding film in contact with the base material in the infrared transmission region;

$n_B$ designates a refractive index of the light shielding film in contact with the base material in a region other than the infrared transmission region; and $k_B$ designates an extinction coefficient of the light shielding film in contact with the base material in a region other than the infrared transmission region.

[6] The optical laminate according to any one of [1] to [5], in which the antireflection film includes at least one layer containing a material whose refractive index is 1.2 to 1.60 with respect to light of a wavelength of 550 nm.

[7] The optical laminate according to any one of [1] to [6], in which the antireflection film further includes a material whose refractive index is 1.61 to 2.7 with respect to light of a wavelength of 550 nm.

[8] The optical laminate according to any one of [1] to [7], in which the antireflection film contains at least one kind of material selected from silicon oxide, magnesium fluoride, magnesium oxide, aluminum fluoride, and silicon oxynitride.

[9] The optical laminate according to any one of [1] to [8], in which the antireflection film contains at least one kind of material selected from niobium oxide, titanium oxide, zinc oxide, tin oxide, aluminum oxide, and silicon nitride,

[10] The optical laminate according to any one of [1] to [9], in which the base material has a curved surface.

Advantages of the Invention

According to the optical laminate of the invention, it is possible to reduce reflectance independently of an incident angle of external light, and it is possible to obtain a neutral reflected color tone.

MODE FOR CARRYING OUT THE INVENTION

Figure 1:
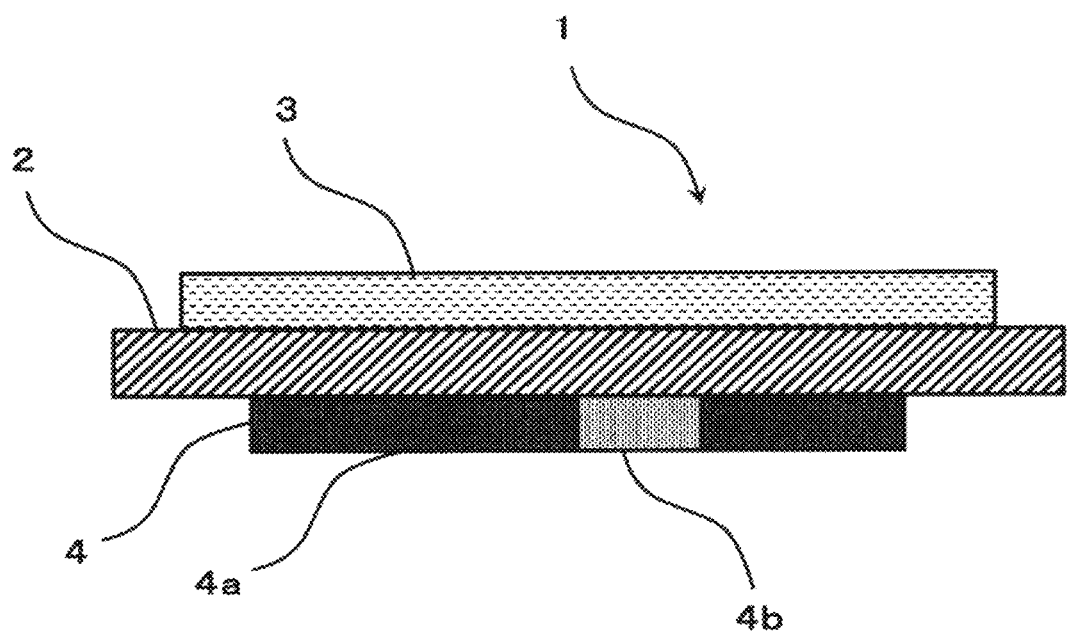
FIG. 1 is a sectional view showing an embodiment of an optical laminate according to the invention.
Figure 2:
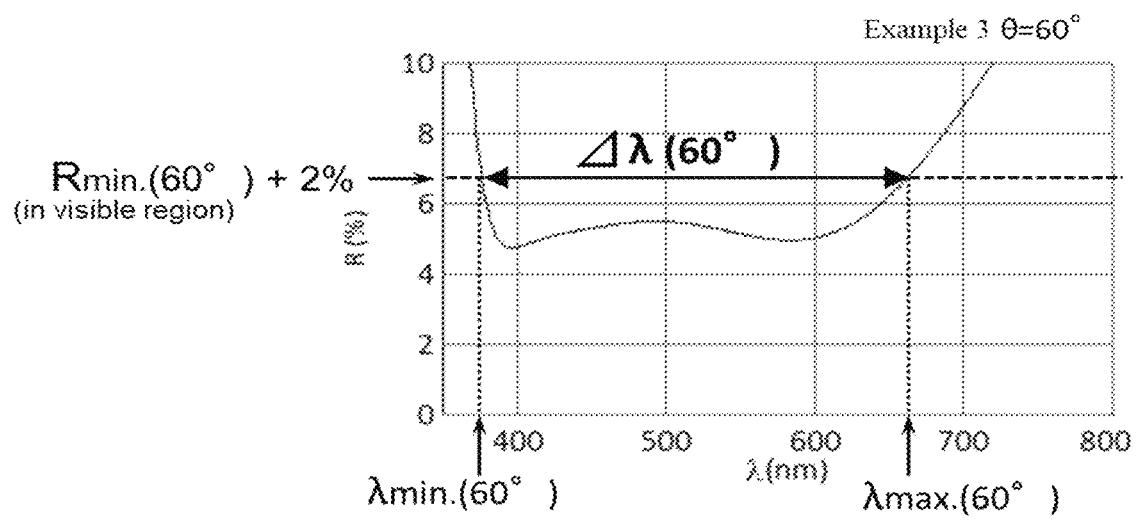
FIG. 2 is a graph showing a spectral reflectance curve at an incident angle of 60° in an optical laminate of Example 3.
Figure 3:
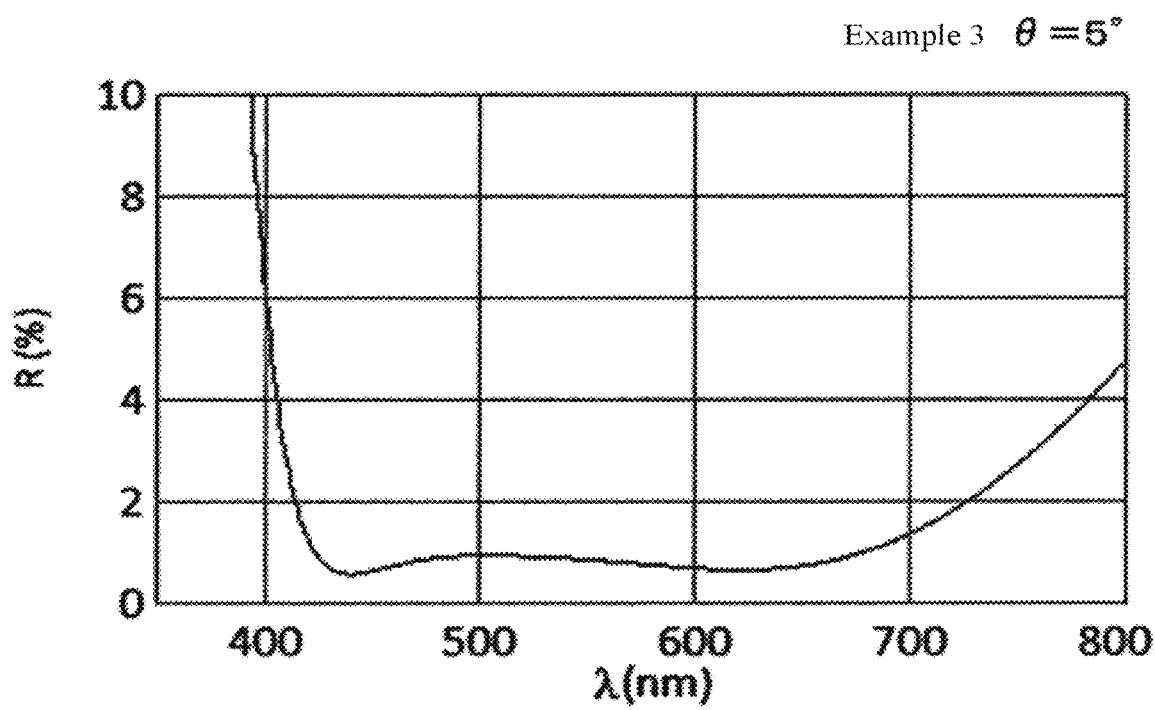
FIG. 3 is a graph showing a spectral reflectance curve at an incident angle of 5° in the optical laminate of Example 3.
Figure 4:
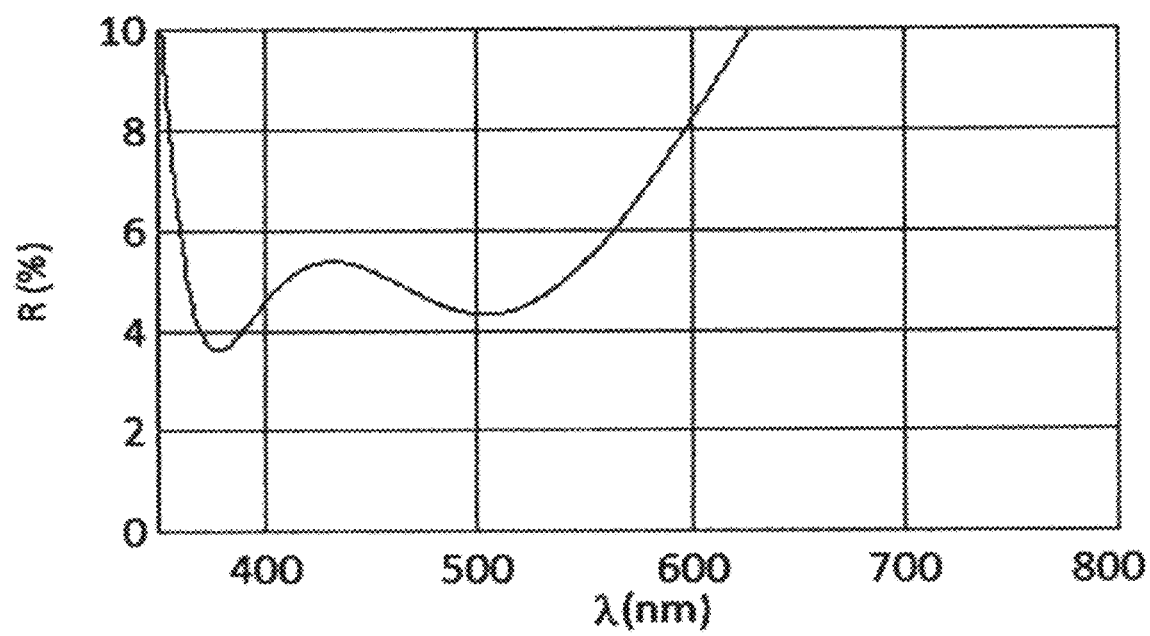
FIG. 4 is a graph showing a spectral reflectance curve at an incident angle of 60° in an optical laminate of Example 6.
Figure 5:
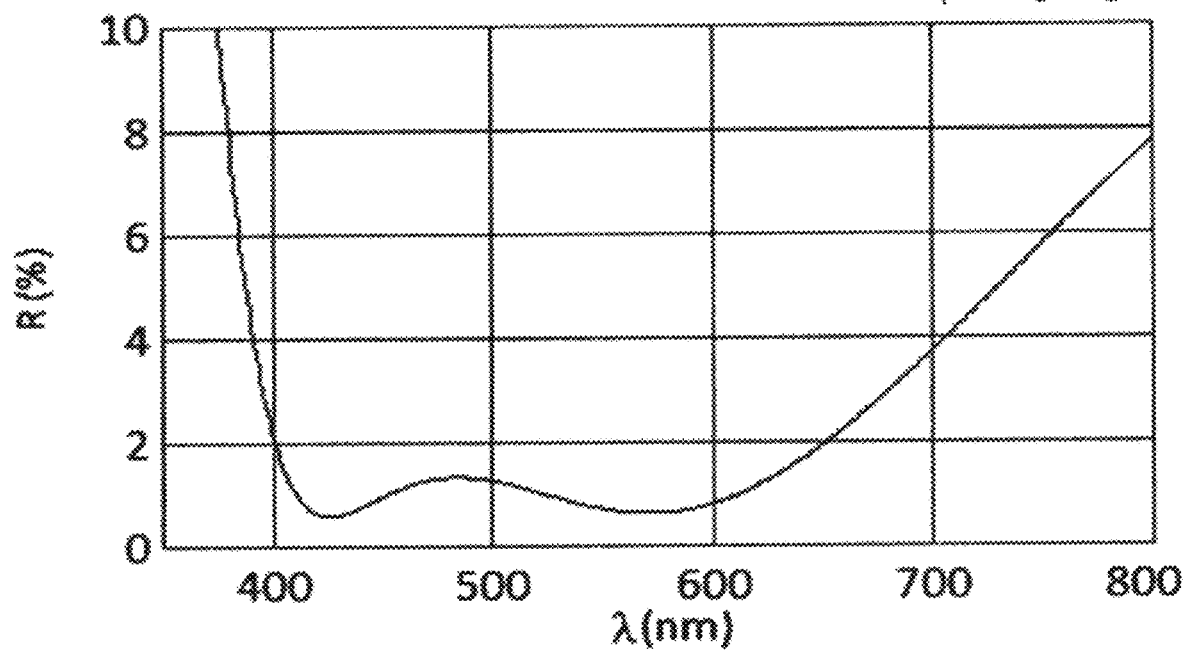
FIG. 5 is a graph showing a spectral reflectance curve at an incident angle of 5° in the optical laminate of Example 6.

An optical laminate 1 according to the invention has a base material 2, an antireflection film 3 that is provided on one surface of the base material 2, and a light shielding film 4 that is provided on the other surface of the base material.

(Base Material)

The shape of the base material is not particularly limited as long as it has surfaces on which the antireflection film and the light shielding film can be provided. The base material may have either a plate-like shape or a film-like shape. In addition, the base material may have either a flat shape or a shape including a curved surface. Further, the base material may have a shape including both a flat part and a curved surface part. In recent years, an image display device whose display surface includes a curved surface has emerged. The optical laminate according to the invention excellent in reflectivity independently of an angle with which an image is viewed by a user is useful particularly for such an application.

In addition, the material of the base material is not particularly limited as long as the antireflection film and the light shielding film can be provided thereon and the material has transparency. For example, a glass, a resin or a material (composite material or laminated material) consisting of those can be used suitably. Preferably, the glass has a composition that can be subjected to strengthening treatment. Examples of such glasses include soda lime glass, borosilicate glass, aluminosilicate glass, alkali-free glass, etc. Examples of such resins include polyethylene terephthalate, polycarbonate, triacetylcellulose, polymethyl methacrylate, etc.

The strengthening treatment includes a treatment in which a compressive stress layer is formed in a surface of a glass plate by a cooling and tempering method (physical strengthening method) or a chemical strengthening method. For example, a chemically strengthened glass base material has a surface compressive stress (CS) of 450 MPa to 1,200 MPa and a stress layer depth (DOL) of 10 μm to 50 μm.

The thickness of the base material may be selected suitably in accordance with application. For example, when a glass base material is used, the thickness thereof is preferably 0.1 to 5 mm, and more preferably 0.2 to 2.5 mm.

(Antireflection Film)

The optical laminate according to the invention has an antireflection film on one surface of the base material. The material of the antireflection film is not particularly limited, and various materials can be used as long as they are materials capable of reducing reflection of visible light. In addition, the antireflection film may be a single layer film formed out of a low refractive index material or a multilayer film in which layers of a low refractive index material and layers of high refractive index material are laminated. Here, the low refractive index material is a material whose refractive index is 1.2 to 1.60 with respect to light of a wavelength of 550 nm. The high refractive index material is a material whose refractive index is 1.61 to 2.7 with respect to light of a wavelength of 550 nm.

Particularly in order to enhance the antireflection performance, it is preferable that the antireflection film is a laminate in which a plurality of layers are laminated. For example, the total number of layers laminated in the laminate is preferably 2 or more and 12 or less, and more preferably 4 or more and 8 or less. Here, it is preferable that the laminate is a laminate in which high refractive index layers and low refractive index layers are laminated alternately, and it is preferable that the total number of the high refractive index layers and the low refractive index layers is within the aforementioned range.

The materials of the high refractive index layers and the low refractive index layers are not particularly limited, and may be selected in consideration of a required degree of antireflection, required productivity, etc.

As the material forming the high refractive index layers, it is possible to suitably use at least one kind selected from niobium oxide ($Nb_2O_5$), titanium oxide ($TiO_2$), zinc oxide (ZnO), tin oxide (SnO), aluminum oxide ($Al_2O_3$), silicon nitride (SiN), zirconium oxide ($ZrO_2$), tantalum oxide ($Ta_2O_5$), and a material of a mixture containing those materials. As the material forming the low refractive index layers, it is possible to suitably use at least one kind selected from silicon oxide ($SiO_2$), magnesium fluoride, magnesium oxide, aluminum fluoride, silicon oxynitride, a mixture of silicon oxide and tin oxide, and a material of a mixture containing those materials.

Assume that niobium oxide ($Nb_2O_5$) and silicon oxide ($SiO_2$) are used as the material of the high refractive index layers and the material of the low refractive index layers respectively, and the high refractive index layers and the low refractive index layers are laminated alternately to obtain an antireflection film of four to eight layers. In this case, the film thickness of silicon oxide ($SiO_2$) in the uppermost layer farthest from the substrate is 80 to 120 nm, and the film thickness of silicon oxide ($SiO_2$) closest to the substrate is preferably in a range of from 0.2 to 0.8, more preferably in a range of from 0.3 to 0.7, and the most preferably in a range of from 0.4 to 0.6 when the film thickness of silicon oxide ($SiO_2$) in the uppermost layer is regarded as 1.

Assume that niobium oxide ($Nb_2O_5$) and silicon oxide ($SiO_2$) are laminated alternately to obtain an antireflection film of six to eight layers. In this case, the film thickness of niobium oxide ($Nb_2O_5$) farthest from the substrate is preferably in a range of from 0.1 to 0.8, more preferably in a range of from 0.2 to 0.7, and further more preferably in a range of from 0.2 to 0.6 when the film thickness of silicon oxide ($SiO_2$) in the uppermost layer is regarded as 1. In addition, the film thickness of niobium oxide ($Nb_2O_5$) in the third layer from the substrate side is preferably in a range of from 0.3 to 1.7, more preferably in a range of from 0.5 to 1.5, and the most preferably in a range of from 0.7 to 1.4 when the film thickness of niobium oxide ($Nb_2O_5$) farthest from the substrate is regarded as 1. Assume that niobium oxide ($Nb_2O_5$) and silicon oxide ($SiO_2$) are laminated alternately to obtain an antireflection film of four to eight layers. In this case, the film thickness of niobium oxide ($Nb_2O_5$) in the lowest layer closest to the substrate is preferably 1 to 30 nm, more preferably 1 to 20 nm, and the most preferably 5 to 15 nm.

Assume that niobium oxide ($Nb_2O_5$) and silicon oxide ($SiO_2$) are laminated alternately to obtain an antireflection film of four to eight layers. In this case, the total film thickness is preferably 150 to 400 nm, more preferably 200 to 300 nm, and further more preferably 220 to 280 nm.

Assume that a material other than niobium oxide ($Nb_2O_5$), such as titanium oxide ($TiO_2$) is used as the high refractive index material so as to obtain an antireflection film in which titanium oxide ($TiO_2$) and silicon oxide ($SiO_2$) are laminated alternately. In this case, the film thickness of titanium oxide ($TiO_2$) is adjusted so that the optical film thickness of the high refractive index material is the same as in the aforementioned case where niobium oxide ($Nb_2O_5$) is used. That is, when the refractive index of niobium oxide ($Nb_2O_5$) at the wavelength of 550 nm is 2.2 and the film thickness of titanium oxide ($TiO_2$) is 2.4, the film thickness of titanium oxide ($TiO_2$) is a film thickness obtained by multiplying the aforementioned film thickness of niobium oxide ($Nb_2O_5$) by 0.92. For example, when the suitable film thickness range of niobium oxide is 5 to 15 nm, the suitable film thickness of titanium oxide is 4.6 nm to 13.8 nm.

The optical laminate according to the invention is characterized by satisfying all of the following optical characteristics (i) to (iii). The invention found that the reflection property can be improved not only with respect to light incident vertically but also with respect to light incident obliquely when the optical laminate satisfies those characteristics.

$$0.5 < R(\lambda_{1a}, \theta_{1a})/R(\lambda_{1b}, \theta_{1b}) < 1.5; \quad (i)$$

$$Y(\theta_2) \leq 3\%; \text{ and} \quad (ii)$$

$$Y(\theta_3) \leq 10\%; \quad (iii)$$

$R(\lambda, \theta)$ designates reflectance when light of a wavelength of $\lambda$ nm is incident at an angle of $\theta$; and
$Y(\theta)$ designates luminous reflectance at an incident angle of $\theta$.

The respective characteristics will be described below in detail.

$$0.5 < R(\lambda_{1a}, \theta_{1a})/R(\lambda_{1b}, \theta_{1b}) < 1.5 (\lambda_{1a}=380 \text{ nm}, \theta_{1a}=60°, \lambda_{1b}=650 \text{ nm}, \theta_{1b}=60° \quad (i)$$

The characteristic (i) defines the ratio of reflectance with respect to light in a red wavelength region to reflectance with respect to light in a blue wavelength region at an incident angle of 60°. The ratio being within a range of from 0.5 to 1.5 means that the two reflectances are on the same level as each other. When the aforementioned reflectance ratio is set within the range, values of reflected colors a and b fall within ranges of $-5 \leq a \leq 5$ and $-5 \leq b \leq 5$ even in an obliquely incident angle, so that a neutral reflected color tone can be obtained. That is, what this means is that even in an obliquely incident angle, reflected light is not excessively inclined to either red or blue, but a neutral reflected color tone can be obtained. The aforementioned reflectance ratio is preferably 0.7 to 1.3.

Note that, as for the characteristic (i), the aforementioned relational expression does not have to be satisfied all over the wavelength regions $\lambda$. It will go well if the aforementioned relational expression is satisfied in any of the wavelengths in the wavelength regions $\lambda$.

$$Y(\theta_2) \leq 3\%)(\theta_2=5°) \quad (ii)$$

The characteristic (ii) defines luminous reflectance at an incident angle of 5°. When the reflectance is 3% or less, it is possible to obtain sufficient antireflection performance in a case of viewing from a direction substantially perpendicular to the substrate. Note that, in the incident angle set at 5°, a state close to an incident angle of 0° (that is, vertical incidence) is assumed.

$$Y(\theta_3) \leq 10\%(\theta_3=60°) \quad (iii)$$

The characteristic (iii) defines luminous reflectance at an incident angle of 60°.

When the reflectance is 10% or less, it is possible to obtain sufficient antireflection performance even with respect to obliquely incident light or it is possible to obtain sufficient antireflection performance even in a case of viewing from an oblique direction to the substrate.

It is preferable that the optical laminate according to the invention further satisfies the following optical characteristic (iv).

$$0.3 < R(\lambda_{2a}, \theta_{2a})/R(\lambda_{2b}, \theta_{2b}) < 1.3 (\theta_{2a}=\theta_{2b}=5°) \quad (iv)$$

in which $\lambda_{2a}$ is within a wavelength region of from 400 nm to 450 nm, and $\lambda_{2b}$ is within a wavelength region of from 700 nm to 790 nm.

The characteristic (iv) defines the ratio of reflectance with respect to light in a red wavelength region to reflectance with respect to light in a blue wavelength region at an incident angle of 5°. The ratio being within a range of from 0.5 to 1.5 means that the two reflectances are on the same level as each other. When the aforementioned reflectance ratio is set within the range, values of reflected colors a and b at the incident angle of 5° fall within ranges of $-5 \leq a \leq 5$ and $-5 \leq b \leq 5$, so that a neutral reflected color tone can be obtained. That is, what this means is that reflected light is not excessively inclined to either red or blue, but a neutral reflected color tone can be obtained. The aforementioned reflectance ratio is preferably 0.7 to 1.3.

In other words, the aforementioned characteristics (i) and (iv) can be defined as the following characteristics (i') and (iv').)

(i') $\lambda$min.(60°)$\leq$400 nm and $\lambda$max.(60°)$\geq$600 nm are established where $\lambda$min.(60° designates a minimum wavelength at which the reflectance of light incident at an angle of 60° is a minimum value (in visible region) plus 2%, and where $\lambda$max.(60° designates a maximum wavelength at which the reflectance of light incident at an angle of 60 is a maximum value (in visible region) plus 2%. In addition, a wavelength width $\Delta\lambda$ (60°)(=$\lambda$max.(60°)–$\lambda$min.(60°)) in lower reflectance region is 250 nm or more, where the reflectance at wavelength between $\lambda$min.(60°) and $\lambda$max.(60°) is below the minimum value of reflectance (in visible region) plus 2%. Thus, it is possible to obtain low reflection performance in a wide wavelength region even in the case of the incident angle of 60°.

(iv') $\lambda$min.(5° 450 nm and $\lambda$max.(5°)$\geq$700 nm are established where $\lambda$min.(5°) designates a minimum value of a wavelength at which reflectance of light incident at an angle of 5° is a minimum value of reflectance (incidence at 60°) in a visible light region+2%, and) $\lambda$max.(5° designates a maximum value of the same wavelength. In addition, a wavelength width Δλ (5°)(=λmax.(5°)−λmin.(5°)) of the low reflection region where the reflectance is the minimum value of reflectance (incidence at 5°)+2% is 300 nm or more. Thus, it is possible to obtain low reflection performance in a wide wavelength region.

It is preferable that the optical laminate according to the invention further satisfies the following characteristic (v):

$$R(\lambda_{3a}, \theta_{3a}) < 2\%; \quad \text{(v)}$$

in which $R(\lambda, \theta)$ designates reflectance when light of a wavelength of λ nm is incident at an angle of θ, provided that $\lambda_{3a}=500$ nm, and $\theta_{3a}=5°$.

The characteristic (v) defines reflectance of light in a green wavelength region. When the reflectance is within the aforementioned range, it is possible to obtain a neutral color tone not too strong in green.

As for reflectance in each wavelength, spectral reflectance at a wavelength of 300 to 1,000 nm is measured according to JIS K5602. As for luminous reflectance, luminous reflectance is obtained based on a CIE light adaptation relative luminosity factor with respect to CIE standard illuminant D65 according to JIS Z8720.

When materials (refractive indexes), film thicknesses, a lamination order on the base material, etc. of respective layers in the antireflection film are adjusted suitably, it is possible to design the optical laminate satisfying the aforementioned characteristics (i) to (iii).

A method for forming the antireflection film will be described in detail in the section of Manufacturing Method.

(Light Shielding Film)

The light shielding film is provided on the other surface of the base material than the surface on which the antireflection film is provided. The light shielding film is a film having a light shielding property.

In the light shielding film 4 according to the invention, all the region within the film may be a light shielding region, or the optical laminate 1 may have a region satisfying T(850, 0°)>60% as shown in FIG. 1. Here, T (850, 0°) designates transmittance when light of a wavelength of 850 nm is incident at an angle of 0°.

The aforementioned relational expression means that the light shielding film 4 has a light shielding region 4a and an infrared transmission region 4b partially.

In the light shielding region in the light shielding film, it is preferable that visible light transmittance measured according to JIS R3106 is 0.1% or less. In the infrared transmission region, it is preferable that visible light transmittance measured according to JIS R3106 is 5% or less, and transmittance of infrared rays of a wavelength of 850 nm to 1,000 nm is 60% or more. Further, it is preferable that transmittance of infrared rays of a wavelength of 900 nm to 1,000 nm is 70% or more.

Further, it is preferable that the following conditions (a) and (b) are satisfied.

(a) $0.8 \times n_B \leq n_A \leq 1.2 \times n_B$ and $0.1 \times k_B \leq k_A \leq 1.8 \times k_B$ at a wavelength of 450 to 650 nm; and (b) $k_A \leq 0.2$ at a wavelength of 850 nm, in which $n_A$ and $k_A$ designate a refractive index and an extinction coefficient of the light shielding film in contact with the base material in an infrared transmission region (A) respectively, and $n_B$ and $k_B$ designate a refractive index and an extinction coefficient of the light shielding film in contact with the base material in a region other than the infrared transmission region, that is, a light shielding region (B) respectively.

When the aforementioned conditions are satisfied, a value $((\Delta a)^2 + (\Delta b)^2)^{1/2}$ expressing a difference in reflected color between the infrared transmission region A and the light shielding region B can be reduced to 2 or less, and a value of luminous reflectance Y(5°) can be reduced sufficiently. That is, favorably the boundary between the infrared transmission region A and the light shielding region B can be prevented from being visually recognized easily.

The light shielding film is formed in such a manner that a solution (ink) in which predetermined materials are dissolved in a solvent is applied or printed on a surface of the base material, and the solvent is removed by evaporation or the like.

Preferably, the light shielding film is formed in such a manner that a solution (ink) in which photocurable resin or thermosetting resin and various pigments are dissolved in a solvent is applied or printed on a surface of the base material, the solvent is removed by evaporation or the like, and the resin is cured by light or heat.

It is preferable that the infrared transmission region in the light shielding film contains photocurable resin or thermosetting resin and a pigment having an infrared transmitting property. The pigment may be either an inorganic pigment or an organic pigment. Examples of such inorganic pigments include iron oxide, titanium oxide, a composite oxide based pigment, etc. Examples of such organic pigments include a metal complex based pigment such as a phthalocyanine-based pigment, an anthraquinone based pigment or an azo-based pigment, etc. Further, a black pigment, a red pigment, a yellow pigment, a blue pigment, a green pigment, etc. may be contained in order to adjust the color tone.

The light shielding region in the light shielding film may contain photocurable resin or thermosetting resin and the aforementioned pigment having an infrared transmitting property. The light shielding region may further contain a black pigment, a red pigment, a yellow pigment, a blue pigment, a green pigment, etc. in order to adjust the color tone.

Further, one or plural light shielding films made of different materials from that of the light shielding film in contact with the base material may be provided onto the light shielding film in contact with the base material in order to adjust the color tone.

Examples of such thermosetting resins include phenolic resin, epoxy resin, melamine resin, urea resin, unsaturated polyester resin, diallyl phthalate resin, polyurethane resin, silicone resin, acrylic resin, etc.

A composition example of the photocurable resin may include a photocurable resin including a monomer containing a polymerizable group. The monomer containing a polymerizable group includes an addition polymerizable monomer containing at least one terminal ethylenically unsaturated group may be used as the monomer containing a polymerizable group. Preferable examples of such addition polymerizable monomers include (meth) acrylic acid, (meth) acrylate, (meth) acrylic amide, vinyl ether, vinyl ester, styrene based compounds, allyl ether, and allyl ester. A (meth) acrylate monomer is more preferred from the viewpoint of hardenability and transparency. (Meth) acrylic acid is a general term of acrylic acid and methacrylic acid. (Meth) acrylate is a general term of acrylate and methacrylate. (Meth) acrylic amide is a general term of acrylic amide and methacrylic amide.

Another monomer that has a cyclic ether structure such as an epoxy group, a glycidyl group, an oxetane group or an oxazoline group may be also used. The number of polymerizable groups in a monomer containing a polymerizable group is preferably 1 to 6, and more preferably 1 or 2.

The visible light transmittance is a value measured at a room temperature according to JTS R3106 by use of a CTE standard illuminant D65 according to JTS Z8720 (2012) as a light source.

A method for forming the light shielding film will be described in detail in the section of Manufacturing Method.

(Antiglare Layer)

The optical laminate according to the invention may include another member other than the base material, the antireflection film and the light shielding film as long as it does not impair the effect of the invention. For example, an antiglare layer may be provided between the base material and the antireflection film. The antiglare layer is a layer having a function in which, reflected light can scatter to reduce glare caused by the reflected light, for example, by forming a layer having an irregular shape on a surface thereof.

(Antifouling Film)

Furthermore, an antifouling film may be provided on the surface of the antireflection film, which is not in contact with the base material. The antifouling layer has a property of oil repellency or water repellency. When the antifouling layer is provided, stains such as a fingerprint traces can be prevented or can be easily wiped away. In addition, finger slidability can be obtained when a touch panel is operated. The material of the antifouling film includes, for example, a fluorine-containing organic silicon compound. A method for forming the antifouling film is not particularly limited, but it is preferable that the antifouling film is formed by vacuum deposition using the aforementioned fluorine-containing organic silicon compound material.

<Manufacturing Method>

(Formation of Antireflection Film)

A method for forming the antireflection film on one surface of the base material is not particularly limited, and various film formation methods can be used. Particularly, it is preferable to form the antireflection film by a method such as pulse sputtering, AC sputtering, or digital sputtering. According to such a method, a dense antireflection film can be formed, and durability can be secured. In addition, film thicknesses of respective layers can be controlled strictly. Thus, a laminated film can be manufactured as designed, so that an antireflection film with desired optical properties can be obtained. Further, according to such a method, the antireflection film can be formed with a uniform film thickness within the surface of the base material. As a result, the antireflection film can be obtained with uniform optical properties within the surface of the base material to prevent reflected color from differing from one place to another within the surface of the base material.

For example, when the antireflection film is formed by pulse sputtering, a glass base material is disposed in a chamber filled with a mixed gas atmosphere of inert gas and oxygen gas, and a target is selected to obtain a desired composition. Thus, the antireflection film can be formed. The gas species of the inert gas is not particularly limited, but various inert gases such as argon, helium, etc. can be used.

When the antireflection film is formed, the concentration of oxidizing gas such as oxygen gas in sputtering gas is set to 30% or less by volume so that the amount of oxygen negative ions produced in plasma can be reduced. The produced oxygen negative ions are accelerated by an electric field gradient and crash with a place such as a vacuum tank inner wall with higher electric potential (normally, ground potential) than a sputtering cathode. Due to repeated film formation, film formation materials have been deposited on the vacuum tank inner wall of the sputtering apparatus. When the oxygen negative ions crash with the deposited materials, the deposited materials are sputtered and released. Thus, the materials are introduced as impurities into the antireflection film. When the concentration of oxidizing gas in the sputtering gas is decreased to reduce the amount of produced oxygen negative ions, impurities can be reduced from being introduced into the antireflection film. In this manner, a dense film quality can be obtained, and an antireflection film excellent in optical properties with a wide wavelength region of low reflection can be obtained. In addition, it is possible to obtain an antireflection film excellent in mechanical properties such as excoriation resistance, adhesion, etc.

(Formation of Light Shielding Film)

The light shielding film is formed in such a manner that a solution (ink) in which photocurable resin or thermosetting resin and various pigments are dissolved in a solvent is applied or printed on a surface of the base material, the solvent is removed by evaporation or the like, and the resin is cured by light or heat.

The aforementioned photocurable resins, thermosetting resins and pigments can be used.

Water, alcohols, esters, ketones, aromatic hydrocarbon based solvents, and aliphatic hydrocarbon based solvents may be used as a solvent. The alcohols including isopropyl alcohol, methanol, ethanol, etc. can be used. The esters including ethyl acetate, and the ketones including methyl ethyl ketone can be used. The aromatic hydrocarbon based solvents including toluene, xylene, Solvesso™ 100, Solvesso™ 150, etc. can be used, and the aliphatic hydrocarbon based solvents including hexane, etc. can be used.

As a method for printing a solution of various materials on a surface of the base material, a method capable of printing with a uniform film thickness is preferred. Examples of such printing methods include roller printing, curtain flow coating, die coating, gravure coating, micro-gravure coating, reverse coating, roll coating, flow coating, spray coating, screen-printing, inkjet printing, etc.

In a case where the infrared transmission region is provided in the light shielding film, for example, a method in which a material solution for forming the infrared transmission region is printed on a part of a surface of the base material; after a solvent of the solution is removed, resin is cured; subsequently a material solution for forming the light shielding region is printed on the other part of the surface of the base material; after a solvent of the solution is removed, resin is cured, can be used.

The film thickness of the light shielding film is preferably 0.1 to 50 μm and more preferably 0.5 to 30 μm in terms of the light shielding property and the excoriation resistance.

When the infrared transmission region is provided, the ratio of the infrared transmission region to the whole area of the light shielding film is preferably 0.01 to 1, more preferably 0.01 to 0.8, and further more preferably 0.05 to 0.5.

EXAMPLES

Example 1

First, ink was applied to be 5 μm thick at a predetermined place on one surface of a glass substrate. The refractive index of the ink at a wavelength of 550 nm was 1.55, and the extinction coefficient of the same was 0.23. The ink contained propylene glycol monomethyl ether acetate (PG-MEA) and dipropylene glycol methyl ether acetate (DPMA) as its major gradients, and contained a black pigment. The ink was then retained at 150° C. for 10 minutes, and dried to form a light shielding film.

Next, an antireflection film was formed on the opposite surface to the surface where the light shielding film was formed, in the following procedure. The glass substrate with the light shielding film was disposed in a vacuum tank of a magnetron sputtering apparatus so that the opposite surface to the light shielding film could serve as a film formation surface. The degree of vacuum in the vacuum tank was set at $1.3 \times 10^{-4}$ Pa. Next, sputtering gas consisting of 5% by volume of oxygen gas and 95% by volume of argon gas was introduced into a film formation chamber to reach $2 \times 10^{-1}$ Pa. Electric power with a power density of 5.5 W/cm$^2$ was applied to a niobium oxide target (NBO target, made by AGC Ceramics Co., Ltd.) so that a high refractive index layer made of niobium oxide was formed to be 12 nm thick on the surface of the glass substrate. Next, sputtering gas consisting of 10% by volume of oxygen gas and 90% by volume of argon gas was introduced into the film formation chamber to reach $2 \times 10^{-1}$ Pa. Pulse sputtering was performed on n-type crystalline silicon as a sputtering target on conditions of a frequency of 20 kHz, an inverted pulse width of 5 μsec, and a power density of 2.8 W/cm$^2$, so that a low refractive index layer consisting of silicon oxide was formed to be 39 nm thick on the niobium oxide film. Further, a high refractive index layer consisting of niobium oxide was formed to be 115 nm thick on the low refractive index layer of the second layer in the same manner as the first layer. Further, a low refractive index layer consisting of silicon oxide was formed to be 90 nm thick in the same manner as the second layer. Thus, the antireflection film was formed of four layers.

As for the optical laminate obtained in Example 1, spectral reflectance in the antireflection film surface at a place where the light shielding film was located on the back side was measured, and luminous reflectance Y and chromaticities a* and b* were obtained therefrom. The spectral reflectance was measured with respect to incident light at each of angles of 5°, 10°, 20°, 30°, 40°, 50°, 60°, and 70° from a normal direction of the antireflection film surface, and the luminous reflectance Y and the chromaticities a* and b* were obtained from each spectral reflectance obtained thus. Those for 5° and 60° incident lights are representatively shown in Table 1.

In addition, as for the optical laminate obtained in Example 1, transmittance with respect to light of a wavelength of 850 nm at an incident angle 0° in the region where the light shielding film was located was 0.02%.

Further, based on the spectral reflectance, the following values were obtained as indexes indicating a low reflection property.

R (380 nm, 60°)/R (650 nm, 60°)
in a wavelength region of from 300 nm to 1,000 nm:
 Minimum wavelength: λmin.
 Maximum wavelength: λmax.
 Δλ=λmax.−λmin.
 Bandwidth ratio=λmax./λmin.
in which the reflectance was "the reflectance minimum value in the visible wavelength region+2%, or less".

Examples 2 to 6

An optical laminate was obtained in the same manner as in Example 1, except that the number of layers of the antireflection film and the film thicknesses of the respective layers were set as shown in Table 1. Spectral reflectance and transmittance were measured in the same manner as in Example 1 to obtain luminous reflectance Y, chromaticities a* and b*, and aforementioned λmin., λmax., Δλ and bandwidth ratio, as shown in Table 1.

Note that Examples 1 to 5 are working examples, and Example 6 is a comparative example.

TABLE 1

|  |  | Example 1 | Example 2 | Example 3 | Example 4 | Example 5 | Example 6 |
|---|---|---|---|---|---|---|---|
| number of layers in antireflection film | | 4 | 6 | 6 | 6 | 8 | 6 |
| antireflection film structure (nm) | SiO$_2$ | — | — | — | — | 92 | — |
| | Nb$_2$O$_5$ | — | — | — | — | 30 | — |
| | SiO$_2$ | — | 90 | 90 | 93 | 10 | 94 |
| | Nb$_2$O$_5$ | — | 43 | 47 | 37 | 21 | 29 |
| | SiO$_2$ | 90 | 17 | 7 | 24 | 13 | 22 |
| | Nb$_2$O$_5$ | 115 | 40 | 53 | 39 | 34 | 18 |
| | SiO$_2$ | 39 | 49 | 40 | 50 | 48 | 18 |
| | Nb$_2$O$_5$ | 12 | 9 | 11 | 9 | 10 | 10 |
| light shielding region (other than IR transmission region) | Y(5°) | 0.72 | 0.73 | 0.76 | 1.04 | 0.87 | 0.86 |
| | Y(60°) | 5.19 | 5.58 | 5.22 | 5.75 | 5.67 | 6.06 |
| | R(380 nm, 60°)/R(650 nm, 60°) | 1.27 | 0.82 | 0.96 | 1.12 | 0.87 | 0.31 |
| | R(λ$_{2a}$, 5°)/R(λ$_{2b}$, 5°) | 1.12 | 1.06 | 1.11 | 0.87 | 0.98 | 0.60 |
| | | λ$_{2a}$ = 420 nm | λ$_{2a}$ = 410 nm | λ$_{2a}$ = 415 nm | λ$_{2a}$ = 420 nm | λ$_{2a}$ = 415 nm | λ$_{2a}$ = 400 nm |
| | | λ$_{2b}$ = 750 nm | λ$_{2b}$ = 720 nm | λ$_{2b}$ = 720 nm | λ$_{2b}$ = 750 nm | λ$_{2b}$ = 750 nm | λ$_{2b}$ = 700 nm |
| | R(500 nm, 5°) | 0.86 | 0.88 | 0.87 | 1.28 | 1.01 | 1.20 |
| | R(500 nm, 5°)/Y(5°) | 1.19 | 1.21 | 1.14 | 1.23 | 1.16 | 1.40 |
| | reflected color 5°(a, b) | (0.24, −3.99) | (1.31, −3.15) | (−1.84, −0.73) | (−1.26, −4.66) | (−0.92, −1.39) | (0.57, −0.94) |
| | reflected color 60°(a, b) | (−1.00, 1.40) | (4.53, 0.43) | (−0.15, −0.21) | (1.93, −2.40) | (0.69, 0.72) | (11.86, 4.68) |
| wavelength region (5°) where reflectance was "reflectance minimum value (visible region) + 2%, or less" | | | | | | | |
| | λmin.(5°) | 419 | 411 | 412 | 417 | 413 | 398 |
| | λmax.(5°) | 763 | 714 | 745 | 755 | 763 | 669 |
| | Δλ(5°) = λmax.(5°) − λmin.(5°) | 344 | 303 | 333 | 338 | 350 | 271 |
| wavelength region (60°) where reflectance was "reflectance minimum value (visible region) + 2%, or less" | | | | | | | |
| | λmin.(60°) | 382 | 377 | 376 | 382 | 375 | 362 |
| | λmax.(60°) | 676 | 630 | 663 | 661 | 657 | 556 |
| | Δλ(60°) = λmax.(60°) − λmin.(60°) | 294 | 253 | 287 | 279 | 282 | 194 |

TABLE 1-continued

|  | Example 1 | Example 2 | Example 3 | Example 4 | Example 5 | Example 6 |
|---|---|---|---|---|---|---|
| Δλ(60°)/Δλ(5°) | 0.85 | 0.83 | 0.86 | 0.83 | 0.81 | 0.72 |
| band width ratio with respect to incident light at incident angle of 60° | 1.770 | 1.671 | 1.763 | 1.730 | 1.752 | 1.536 |

When the reflectance ratio satisfied 0.5<R(380 nm, 60°)/R(650 nm, 60°)<1.5 as in Examples 1 to 5, a neutral reflected color tone in which the chromaticities a* and b* of reflected color with respect to incident light at an incident angle of 60° satisfied −5<a*<5 and −5<b*<5 could be obtained.

On the other hand, when the reflectance ratio did not satisfy 0.5<R(380 nm, 60°)/R(650 nm, 60°)<1.5 but was smaller than 0.5, the chromaticities a* and b* of reflected color with respect to the incident light at the incident angle of 60° were largely out of the ranges of −5<a*<5 and −5<b*<5, and a neutral reflected color tone could not be obtained, but a reflected color tone was strong in red.

When the bandwidth ratio with respect to the incident light at the incident angle of 60° was larger than 1.600 as in Examples 1 to 5, a neutral reflected color tone satisfying −5<a*<5 and −5<b*<5 could be obtained.

On the other hand, when the bandwidth ratio with respect to the incident light at the incident angle of 60° was smaller than 1.600 as in Example 6, the chromaticities a* and b* were largely out of the ranges of −5<a*<5 and −5<b*<5, and a neutral reflected color tone could not be obtained, but a reflected color tone was strong in red.

When Δλ(5°)>300 nm was satisfied with respect to incident light at an incident angle of 5° and Δλ(60°)>250 nm was satisfied with respect to incident light at an incident angle of 60° as in Examples 1 to 5, a neutral reflected color tone could be obtained even if the incident angle of the incident light changed. Thus, chromaticities a* and b* of reflected color with respect to incident light at an incident angle of 60° could satisfy −5<a*<5 and −5<b*<5.

When λmin.(5°)≤450 nm and λmax.(5°)≥700 nm were satisfied with respect to incident light at an incident angle of 5° and λmin.(60°)≤400 nm and λmax.(60°)≥600 nm were satisfied with respect to incident light at an incident angle of 60° as in Examples 1 to 5, a neutral reflected color tone could be obtained even if the incident angle of the incident light changed. Thus, the chromaticities a* and b* of reflected color with respect to the incident light at the incident angle of 60° could satisfy −5<a*<5 and −5<b*<5.

Example 7

An optical laminate was manufactured in the same manner as in Example 3, except that ink for forming the light shielding film was ink which had a refractive index and an extinction coefficient shown in Table 2, and which contained propylene glycol monomethyl ether acetate (PGMEA) and dipropylene glycol methyl ether acetate (DPMA) as its major gradients, and contained a black pigment.

As for the optical laminate obtained thus, spectral reflectance with respect to incident light at an incident angle of 5° was measured in the same manner as in Example 3 to obtain luminous reflectance Y and chromaticities a* and b*, as shown in Table 2. Further, in order to express a difference in reflected color from that of Example 3, a value of $((\Delta a)^2+(\Delta b)^2)^{1/2}$ was obtained as an index, as shown together in Table 2, where Δa* designates the difference in chromaticity a* and Δb* designates the difference in chromaticity b*. In addition, transmittance with respect to light of a wavelength of 850 nm incident on the obtained optical laminate at an angle of 0° was 70.9%, and transmittance with respect to light of a wavelength of 940 nm incident on the same at an angle of 0° was 75.6%.

Examples 8 to 12

Similar to Example 7, an optical laminate was manufactured in the same manner as in Example 3, except that ink for forming the light shielding film was the ink, which had a refractive index, an extinction coefficient and a composition shown in Table 2. As for the optical laminate obtained thus, luminous reflectance Y, chromaticities a* and b*, and a value of $((\Delta a)^2\pm(\Delta b)^2)^{1/2}$ with respect to incident light at an incident angle of 5° were obtained in the same manner as in Example 7, as shown together in Table 2.

In addition, numeric values of respective coefficients at 450 nm, 550 nm and 650 nm are shown in Table 3, where $n_{II}$ and $k_{II}$ designate the refractive index and the extinction coefficient of the ink for the light shielding film in Example 3, and $n_I$ and $k_I$ designate the refractive index and the extinction coefficient of the ink for the light shielding film in each of Examples 7 to 11 and Example 12.

Note that Examples 7 to 11 are working examples, and Example 12 is a comparative example.

TABLE 2

|  |  | Example 3 | Example 7 | Example 8 | Example 9 | Example 10 | Example 11 | Example 12 |
|---|---|---|---|---|---|---|---|---|
| number of layers in antireflection film |  | 6 | 6 | 6 | 6 | 6 | 6 | 6 |
| optical constant of light shielding film (wavelength 550 nm) | refractive index | 1.55 | 1.52 | 1.55 | 1.55 | 1.64 | 1.51 | 1.55 |
|  | extinction coefficient | 0.23 | 0.10 | 0.05 | 0.41 | 0.11 | 0.04 | 0.46 |
| Y(5°) |  | 0.76 | 0.34 | 0.26 | 1.9 | 0.46 | 0.27 | 2.29 |
| reflected color 5°(a) |  | −1.84 | −0.44 | −1.7 | −1.31 | −2.62 | −0.67 | −1.22 |
| reflected color 5°(b) |  | −0.73 | 0.35 | −1.15 | 0.13 | 0.53 | −0.74 | 0.29 |
| $((\Delta a)^2 + (\Delta b)^2)^{1/2}$ |  | — | 1.77 | 0.44 | 1.01 | 1.49 | 1.17 | 1.19 |

TABLE 3

|  |  | 450 nm | 550 nm | 650 nm |
|---|---|---|---|---|
| Example 3 | $n_{II}$ | 1.52 | 1.55 | 1.58 |
|  | $k_{II}$ | 0.22 | 0.23 | 0.23 |
| Example 7 | $n_I$ | 1.54 | 1.52 | 1.64 |
|  | $k_I$ | 0.03 | 0.10 | 0.11 |
| Example 8 | $n_I$ | 1.52 | 1.55 | 1.58 |
|  | $k_I$ | 0.04 | 0.05 | 0.05 |
| Example 9 | $n_I$ | 1.52 | 1.55 | 1.58 |
|  | $k_I$ | 0.4 | 0.41 | 0.41 |
| Example 10 | $n_I$ | 1.52 | 1.64 | 1.66 |
|  | $k_I$ | 0.10 | 0.11 | 0.03 |
| Example 11 | $n_I$ | 1.54 | 1.51 | 1.58 |
|  | $k_I$ | 0.01 | 0.04 | 0.13 |
| Example 12 | $n_I$ | 1.52 | 1.55 | 1.58 |
|  | $k_I$ | 0.44 | 0.46 | 0.46 |

$((\Delta a)^2+(\Delta b)^2)^{1/2}$ in Examples 7 to 11 was a sufficiently small value to be 2 or less with a sufficient small difference in reflected color from that in Example 3, when satisfying at a wavelength of 450 to 650 nm as in Examples 7 to 11:

$$0.8 \times n_{II} \le 1.2 \times n_{II} \text{ and}$$

$$0.1 \times k_{II} \le 1.8 \times k_{II}$$

At the same time, the Y value in Examples 7 to 11 was 2% or less and difference from the Y value in Example 3 was 1.2% or less. Thus, the difference in reflectance from Example 3 was sufficiently small.

When the region of Example 3 is adjacent to any one of the regions of Examples 7 to 11, it is preferable that the difference in reflected color and the difference in reflectance are so small that favorably the boundary between the region of Example 3 and the region of Examples 7 to 11 cannot be visually recognized easily.

$((\Delta a)^2+(\Delta b)^2)^{1/2}$ in Example 12 is sufficiently small to be 2 or less when not satisfying the below at a wavelength of 450 to 650 nm as in Example 12:

$$0.8 \times n_{II} \le 1.2 \times n_{II} \text{ and}$$

$$0.1 \times k_{II} \le k_I \le 1.8 \times k_{II}$$

However, the Y value exceeds 2%, and the difference from the Y value in Example 3 exceeds 1.5%. Thus, the difference in reflectance is large.

When the place of Example 12 is adjacent to the place of Example 3, the difference in reflected color is sufficiently small, but the difference in reflectance is so large that the boundary between the place of Example 12 and the place of Example 3 can be visually recognized easily. This is not preferred.

Example 13

A coating solution containing a hydrolyzed polymer of alkoxysilane and silica fine particles was applied onto one surface of a glass substrate, and then retained at 450° C. for 30 minutes to form an antiglare layer 200 nm thick with irregularities in a surface thereof.

Next, ink was applied to be 2 μm thick at a predetermined place (region B) on the opposite surface to the surface where the antiglare layer was formed. The refractive index and the extinction coefficient of the ink at a wavelength of 450 nm were 1.52 and 0.10 respectively, the refractive index and the extinction coefficient of the ink at a wavelength of 550 nm were 1.54 and 0.12 respectively, and the refractive index and the extinction coefficient of the ink at a wavelength of 650 nm were 1.56 and 0.13 respectively. In the same manner, ink was applied to be 2 μm thick at a predetermined place (region A) different from the region B on the opposite surface to the surface where the antiglare layer was formed. The refractive index and the extinction coefficient of the ink at a wavelength of 450 nm were 1.54 and 0.03 respectively, the refractive index and the extinction coefficient of the ink at a wavelength of 550 nm were 1.52 and 0.10 respectively, the refractive index and the extinction coefficient of the ink at a wavelength of 650 nm were 1.64 and 0.11 respectively, the refractive index and the extinction coefficient of the ink at a wavelength of 850 nm were 1.65 and 0.007 respectively, and the refractive index and the extinction coefficient of the ink at a wavelength of 940 nm were 1.64 and 0.002 respectively. The coated substrate was then retained at 150° C. for 10 minutes to dry. Further, ink was applied to be 3 μm thick in the region B. The refractive index and the extinction coefficient of the ink at a wavelength of 550 nm were 1.55 and 0.23 respectively. The coated substrate was retained again at 150° C. for 10 minutes, to dry. In the aforementioned procedure, a light shielding film including two kinds of light shielding portions (an infrared transmission region A and a light shielding region B) were formed in a part of the opposite surface to the surface where the antiglare layer was formed.

Further, an antireflection film was formed on the antiglare layer in the same manner as in Example 1, except that the number of layers and the film thicknesses of the respective layers in the antireflection film were set as shown in Table 4.

In the aforementioned procedure, an optical laminate was obtained in which the antireflection film and the antiglare layer were applied to one surface of the glass substrate, and the light shielding film including the two kinds of light shielding portions (the infrared transmission region A and the light shielding region B) was provided in a part of the other surface of the substrate.

As for the light shielding region B of the optical laminate obtained thus, spectral reflectance and transmittance were measured in the same manner as in Examples 1 to 6 to obtain luminous reflectance Y, chromaticities a* and b*, aforementioned λmin., λmax., Δλ and bandwidth ratio, and further reflected color 0° (a, b) SCI, reflected color 0° (a, b) SCE, and diffuse reflectance)(0° (SCI, SCE), as shown together in Table 4. In addition, transmittance at wavelengths of 550 nm, 850 nm and 940 nm in the infrared transmission region A are shown together in Table 4. Further, transmittances at wavelengths of 550 nm and 940 nm in the region where the light shielding film was not provided are shown together in Table 4.

Example 14

An optical laminate in which an antireflection film and an antiglare layer were applied to one surface of a glass substrate, and a light shielding film including two kinds of light shielding portions (an infrared transmission region A and a light shielding region B) was provided in a part of the other surface of the substrate was obtained in the same manner as in Example 13, except that the number of layers in the antireflection film and the film thicknesses of the respective layers were set as shown in Table 4. As for the optical laminate obtained thus, luminous reflectance Y, chromaticities a* and b*, aforementioned λmin., λmax., Δλ, bandwidth ratio, reflected color 0° (a, b) SCI, reflected color 0° (a, b) SCE, diffuse reflectance)(0° (SCI, SCE), and transmittances at respective wavelengths are shown together in Table 4.

Also in Examples 13 and 14, when 0.5<R(380 nm, 60°)/R(650 nm, 60°)<1.5 was satisfied, a more neutral reflected color tone in which the chromaticities a* and b* of reflected color with respect to incident light at an incident angle of 60° satisfied −5<a*<5 and −5<b*<5, further, −3<a*<3 and −3<b*<3, could be obtained.

In Examples 13 and 14, the bandwidth ratio with respect to the incident light at the incident angle of 60° was a value larger than 1.700. Thus, a more neutral reflected color tone satisfying −2<a*<2 and −2<b*<2 could be obtained.

Examples 13 and 14 satisfied Δλ(5°)>350 nm with respect to incident light at an incident angle of 5° and Δλ(60°)>270 nm with respect to incident light at an incident angle of 60°. Thus, a more neutral reflected color tone could be obtained even though the incident angle of the incident light changed. Thus, the chromaticities a* and b* of reflected color with respect to the incident light at the incident angle of 60° could satisfy −2<a*<2 and −2<b*<2.

In Examples 13 and 14, λmin. and λmax. satisfied λmin.(5°)≤420 nm and λmax.(5°)≥750 nm with respect to incident light at an incident angle of 5°, and satisfied λmin.(60°)≤400 nm and λmax.(60°)≥640 nm with respect to incident light at an incident angle of 60°. Thus, a more neutral reflected color tone could be obtained even though the incident angle of the incident light changed. Thus, the chromaticities a* and b* of reflected color with respect to the incident light at the incident angle of 60° could satisfy −2<a*<2 and −2<b*<2.

At a wavelength of 450 to 650 nm, Examples 13 and 14 satisfied $0.8 \times n_B \leq n_A \leq 1.2 \times n_B$ and $0.1 \times k_B \leq k_A \leq 1.8 \times k_B$, where:

$n_A$ designates a refractive index of the light shielding film in contact with the base material in the infrared transmission region A;

$k_A$ designates an extinction coefficient of the light shielding film in contact with the base material in the infrared transmission region A;

$n_B$ designates a refractive index of the light shielding film in contact with the base material in the light shielding region B; and $k_B$ designates an extinction coefficient of the light shielding film in contact with the base material in the light shielding region B.

Thus, an optical laminate, in which the boundary between the infrared transmission region A and the light shielding region B could not be visually recognized easily in observation from the antireflection film surface, could be obtained.

In addition, Examples 13 and 14 satisfied $k_A \leq 0.2$ at a wavelength of 850 nm, and further satisfied $k_A \leq 0.1$. Thus, an optical laminate, which was provided with a high infrared transmittance region where the transmittance of light of the wavelength 850 nm exceeded 80% in the region A, could be obtained.

Further, Examples 13 and 14 also satisfied $k_A \leq 0.2$ at a wavelength of 940 nm, and further satisfied $k_A \leq 0.1$. Thus, an optical laminate, which was provided with a high infrared transmittance region where the transmittance of light of the wavelength 940 nm exceeded 77% in the region A, could be obtained.

Example 15

An antiglare layer was formed on one surface of a glass substrate, and two kinds of light shielding portions (an infrared transmission region A and a light shielding region B) were formed in a part of the other surface of the substrate, in the same manner as in Example 13.

Next, an antireflection film was formed on the antiglare layer by use of a post-reaction sputtering method in the following procedure. The post-reaction sputtering method is a method in which formation of a metal ultrathin film by a sputtering method and post-reaction (oxidization, nitridization or the like after the film formation) are repeated to form an inorganic oxide film, an inorganic nitride film or the like. A region for forming a film by a sputtering method and a region provided with an oxidization source, a nitridization source or the like are provided in a vacuum tank, and a base material is conveyed between the two regions repeatedly. Thus, an inorganic oxide film, an inorganic nitride film or the like with a desired film thickness can be obtained. The glass substrate provided with the antiglare layer and the two kinds of light shielding portions was disposed in the vacuum tank where film formation can be performed by the aforementioned post-reaction sputtering method, so that the antiglare layer could serve as a film formation surface. The degree of vacuum in the vacuum tank was set at $1.3 \times 10^{-4}$ Pa. Next, sputtering gas consisting of 100% by volume of argon gas was introduced into the region where film formation should be performed by sputtering in the vacuum tank, until reaching $2 \times 10^{-1}$ Pa. Oxygen gas was introduced into the region where the oxidization source was provided, until reaching $4 \times 10^{-1}$ Pa. Electric power with a power density of 5.5 W/cm$^2$ was applied to a metal niobium target, and electric power for the oxidization source was set at 1 kw, so that a high refractive index layer consisting of niobium oxide was formed to be 9 nm thick on the antiglare layer. Next, on the condition that sputtering gas consisting of 100% by volume of argon gas was introduced to reach $2 \times 10^{-1}$ Pa in the same manner, electric power with a power density of 5.5 W/cm$^2$ (a frequency of 20 kHz, and an inverted pulse width of 5 μsec) was applied to an n-type crystalline silicon target, and electric power for the oxidization source was set at 1 kw, so that a low refractive index layer consisting of silicon oxide was formed to be 50 nm thick on the niobium oxide film. Niobium oxide was applied in the same manner as the first layer, and silicon oxide was applied in the same manner as the second layer, so as to form an antireflection film of eight layers, which had film thicknesses shown in Table 4 respectively.

In the aforementioned procedure, an optical laminate was obtained in which the antireflection film and the antiglare layer were applied onto one surface of the glass substrate, and the two kinds of light shielding portions (the infrared transmission region A and the light shielding region B) were provided in a part of the other surface of the substrate.

As for the region B of the optical laminate obtained thus, spectral reflectance and transmittance were measured in the same manner as in Example 13, so as to obtain luminous reflectance Y, chromaticities a* and b*, aforementioned λmin., λmax., Δλ, bandwidth ratio, reflected color 0° (a, b) SCI, reflected color 0° (a, b) SCE, and diffuse reflectance (0°), as shown together in Table 4. In addition, transmittances at respective wavelengths of 550 nm, 850 nm and 940 nm in the infrared transmission region A are shown together in Table 4. Further, transmittances at respective wavelengths of 550 nm and 940 nm in the region where the light shielding film was not provided are shown together in Table 4.

Example 16

An antiglare layer was formed on a glass substrate in the same manner as in Example 13. The glass substrate had a curved surface portion (curvature radius of 200 mm) partially so that a curved surface was formed continuously to a flat portion. The antiglare layer was formed on the side where the glass surface was convex in the curved surface portion. Next, a light shielding film having two kinds of light shielding portions (an infrared transmission region A and a light shielding region B) was formed in a part of the opposite surface to the surface where the antiglare layer was formed, in the same manner as in Example 13. Next, an antireflection film was formed on the antiglare layer in the same manner as in Example 15, except that the number of layers in the antireflection film and the film thicknesses of the respective layers were set as shown in Table 4. An antifouling film 5 nm thick was formed further on the antireflection film. The antifouling film was formed in the following method.

A region in which the antifouling film could be deposited was provided in the aforementioned vacuum tank in which film formation could be performed by the post-reaction sputtering method. The antireflection film had been formed therein and without being extracted from the vacuum tank, the antifouling film was formed in vacuum continuously after the formation of the antireflection film. Specifically, a composition for forming a fluorine-containing organic silicon compound film (Afluid® 5550, made by AGC Inc.) was put into a heating vessel, and heated to 280° C., and film formation was performed until the film thickness of the fluorine-containing organic silicon compound film reached 5 nm on the antireflection film while the film thickness was measured by a crystal resonator monitor placed in the vacuum tank. Note that before the start of manufacturing of the optical laminate according to this Example, the composition for forming a fluorine-containing organic silicon compound film was degassed in the vacuum tank in advance to remove a solvent appropriately. After that, the temperature of the heating vessel was increased to 280° C., and then kept until the temperature of the composition was stabilized.

The material of the antifouling film can be selected from materials that can provide water repellency and oil repellency. However, a fluorine-containing silicon compound is preferred. For example, an organic silicon compound containing at least one group selected from a perfluoropolyether group, a perfluoroalkyl group and a perfluoroalkylene group is preferred. As such organic silicon compounds commercially available, KY-178 and KY-185 (each made by Shin-Etsu Chemical Co., Ltd.), OPTOOL DSX (made by DAIKIN Industries, Ltd.), Afluid® S550 (made by AGC Inc.), etc. can be used suitably.

In the aforementioned procedure, obtained was an optical laminate in which the antifouling film, the antireflection film and the antiglare layer were applied onto the glass substrate with a curved surface portion on the side where the glass surface was convex in the curved surface portion, and the light shielding film including the two kinds of light shielding portions (the infrared transmission region A and the light shielding region B) was provided in a part of the other surface of the substrate.

As for the region B of the optical laminate obtained thus, spectral reflectance and transmittance were measured in the same manner as in Example 13, so as to obtain luminous reflectance Y, chromaticities a* and b*, aforementioned λmin., λmax., Δλ, bandwidth ratio, reflected color 0° (a, b) SCI, reflected color 0° (a, b) SCE, and diffuse reflectance) (0°)(SCI, SCE), as shown together in Table 4. In addition, transmittances at respective wavelengths of 550 nm, 850 nm and 940 nm in the region A are shown together in Table 4. Further, transmittances at respective wavelengths of 550 nm and 940 nm in the region where the light shielding film was not provided are shown together in Table 4. The aforementioned optical properties were measured in the flat portion, which did not belong to the curved surface portion of the substrate.

Also in Examples 15 and 16, when 0.5<R(380 nm, 60°)/R(650 nm, 60°)<1.5 was satisfied, a more neutral reflected color tone, in which the chromaticities a* and b* of reflected color with respect to incident light at an incident angle of 60° satisfied −5<a*<5 and −5<b*<5 and further satisfied −3<a*<3 and −3<b*<3, could be obtained.

In Examples 15 and 16, the bandwidth ratio with respect to the incident light at the incident angle of 60° was a value larger than 1.700 and −3<a*<3 and −3<b*<3 was satisfied. Thus, a more neutral reflected color tone could be obtained.

Examples 15 and 16 satisfied Δλ(5°)>350 nm with respect to incident light at an incident angle of 5° and Δλ(60°)>270 nm with respect to incident light at an incident angle of 60°. Thus, a more neutral reflected color tone could be obtained even though the incident angle of the incident light changed. Thus, the chromaticities a* and b* of reflected color with respect to the incident light at the incident angle of 60° could satisfy −3<a*<3 and −3<b*<3.

In Examples 15 and 16, λmin. and λmax. satisfied λmin.(5°)≤420 nm and λmax.(5°)≥750 nm with respect to incident light at an incident angle of 5°, and satisfied λmin.(60°)≤400 nm and λmax.(60°)≥640 nm with respect to incident light at an incident angle of 60°. Thus, a more neutral reflected color tone could be obtained even though the incident angle of the incident light changed. Thus, the chromaticities a* and b* of reflected color with respect to the incident light at the incident angle of 60° could satisfy −3<a*<3 and −3<b*<3.

In Example 16, the respective reflection characteristics with respect to the incident light at the incident angle of 60° were satisfied, and thus a neutral reflected color tone could be obtained even in the curved surface portion. In addition, even in the place where the incident angle of light changed continuously from the flat portion to the curved portion, the reflected color did not change largely but a neutral reflected color tone could be obtained. In addition, even in a place where an angle with which an observer observed changed continuously from the flat portion to the curved portion, the reflected color did not change largely but a neutral reflected color tone could be obtained.

At a wavelength of 450 to 650 nm, Examples 15 and 16 satisfied $0.8 \times n_B \leq n_A \leq 1.2 \times n_B$ and $0.1 \times k_B \leq k_A \leq 1.8 \times k_B$ at a wavelength of 450 to 650 nm, where:

$n_A$ designates a refractive index of the light shielding film in contact with the base material in the region A;

$k_A$ designates an extinction coefficient of the light shielding film in contact with the base material in the region A;

$n_B$ designates a refractive index of the light shielding film in contact with the base material in the region B; and $k_B$ designates an extinction coefficient of the light shielding film in contact with the base material in the region B.

Thus, an optical laminate could be obtained in which the boundary between the region A and the B could not be visually recognized easily in observation from the antireflection film surface.

In addition, Examples 15 and 16 satisfied $k_A \leq 0.2$ at a wavelength of 850 nm, and further satisfied $k_A \leq 0.1$. Thus, an optical laminate could be obtained which was provided with a high infrared transmittance region where the transmittance of light of the wavelength of 850 nm exceeded 80% in the region A.

Further, Examples 15 and 16 also satisfied $k_A \leq 0.2$ at a wavelength of 940 nm, and further satisfied $k_A \leq 0.1$. Thus, an optical laminate could be obtained which was provided with a high infrared transmittance region where the transmittance of light of the wavelength of 940 nm exceeded 78% in the region A.

Examples 13 to 16 are working examples.

TABLE 4

|  |  | Example 13 | Example 14 | Example 15 | Example 16 |
|---|---|---|---|---|---|
| number of layers in antireflection film | | 6 | 6 | 8 | 8 |
| antireflection film structure (nm) | $SiO_2$ | — | — | 94 | 90 |
| | $Nb_2O_5$ | — | — | 27 | 28 |
| | $SiO_2$ | 86 | 92 | 9 | 6 |
| | $Nb_2O_5$ | 46 | 37 | 22 | 21 |
| | $SiO_2$ | 8 | 24 | 17 | 13 |
| | $Nb_2O_5$ | 47 | 39 | 35 | 34 |
| | $SiO_2$ | 42 | 50 | 50 | 45 |
| | $Nb_2O_5$ | 10 | 9 | 9 | 9 |
| light shielding film (light shielding region B) | Y(5°) | 0.64 | 0.44 | 0.37 | 0.72 |
| | Y(60°) | 3.95 | 3.90 | 3.83 | 4.03 |
| | diffuse reflectance (0°), including regular reflection light (SCI) | 0.91 | 0.71 | 0.62 | 0.97 |
| | diffuse reflectance (0°), not including regular reflection light (SCE) | 0.18 | 0.25 | 0.27 | 0.20 |
| | R(380 nm, 60°)/R(650 nm, 60°) | 0.74 | 0.74 | 0.86 | 0.66 |
| | $R(\lambda_{2a}, 5°)/R(\lambda_{2b}, 5°)$ | 1.01 | 1.13 | 1.11 | 1.06 |
| | | $\lambda_{2a}$ = 410 nm, $\lambda_{2b}$ = 730 nm | $\lambda_{2a}$ = 410 nm, $\lambda_{2b}$ = 750 nm | $\lambda_{2a}$ = 415 nm, $\lambda_{2b}$ = 770 nm | $\lambda_{2a}$ = 410 nm, $\lambda_{2b}$ = 750 nm |
| | R(500 nm, 5°) | 0.72 | 0.55 | 0.39 | 0.69 |
| | R(500 nm, 5°)/Y(5°) | 1.13 | 1.25 | 1.05 | 0.96 |
| | reflected color 5°(a, b) | (−0.99, 0.29) | (−2.68, 0.82) | (−0.25, 0.34) | (−0.57, 0.62) |
| | reflected color 60°(a, b) | (−0.22, 0.63) | (0.61, −1.13) | (−1.68, 2.91) | (−1.97, 2.80) |
| | reflected color 0°(a, b): SCI | (−2.5, −0.2) | (−1.1, −2.2) | (−0.5, −1.6) | (−1.3, −1.0) |
| | reflected color 0°(a, b): SCE | (−2.0, 0.0) | (−1.0, −1.8) | (−0.5, −1.2) | (−0.4, −1.4) |
| | wavelength region (5°) where reflectance was "reflectance minimum value (visible region) + 2% or less" | | | | |
| | $\lambda$min.(5°) | 405 | 407 | 412 | 403 |
| | $\lambda$max.(5°) | 761 | 771 | 794 | 790 |
| | $\Delta\lambda(5°) = \lambda$max.(5°) − $\lambda$min.(5°) | 356 | 364 | 382 | 387 |
| | wavelength region (60°) where reflectance was "reflectance minimum value (visible region) + 2% or less" | | | | |
| | $\lambda$min.(60°) | 373 | 374 | 377 | 371 |
| | $\lambda$max.(60°) | 651 | 649 | 655 | 644 |
| | $\Delta\lambda(60°) = \lambda$max.(60°) − $\lambda$min.(60°) | 278 | 275 | 278 | 273 |
| | $\Delta\lambda(60°)/\Delta\lambda(5°)$ | 0.78 | 0.76 | 0.73 | 0.71 |
| | band width ratio with respect to incident light at incident angle of 60° | 1.745 | 1.735 | 1.737 | 1.736 |
| light shielding film (IR transmission region A) | T(940 nm, 0°) | 77.7 | 79.0 | 80.3 | 79.0 |
| | T(850 nm, 0°) | 81.4 | 83.6 | 84.5 | 82.2 |
| | T(550 nm, 0°) | 1.07 | 0.72 | 0.30 | 1.08 |
| transparent region (region not applied with light shielding film) | T(940 nm, 0°) | 84.0 | 86.8 | 86.9 | 86.5 |
| | T(5500 nm, 0°) | 93.6 | 93.3 | 93.3 | 93.3 |

INDUSTRIAL APPLICABILITY

An optical laminate according to the invention is useful as a cover member or the like in various image display devices.

Although the invention has been described in detail with reference to its specific embodiments, it is obvious for those skilled in the art that various changes and modifications can be made on the invention without departing from the spirit and scope thereof. The present application is based on a Japanese patent application (Japanese Patent Application No. 2018-113157) filed on Jun. 13, 2018, all the contents of which are incorporated by reference. In addition, all the references cited herein are incorporated as a whole.

REFERENCE SIGNS LIST

1 optical laminate
2 base material
3 antireflection film
4 light shielding film
4a light shielding region
4b infrared transmission region

What is claimed is:

1. An optical laminate, comprising:
a base material;
an antireflection film provided on one surface of the base material; and
a light shielding film provided on the other surface of the base material and comprising a pigment and a cured product of a photocurable resin and/or a thermosetting resin,
wherein
the light shielding film has a visible light transmittance of 0.1% or less and has a thickness of from 0.1 pm to 50 μm, and
the optical laminate satisfies all of the following characteristics (i) to (iii):

$0.5 < R(\lambda_{1a}, \theta_{1a})/R(\lambda_{1b}, \theta_{1b}) < 1.5;$ (i)

$Y(\theta_2) \leq 3\%;$ and (ii)

$Y(\theta_3) \leq 10\%;$ (iii)

wherein R ($\lambda, \theta$) designates reflectance when a light of a wavelength of $\lambda$ nm is incident at an angle of $\theta$, provided that:

$\lambda_{1a} = 380$ nm, $\theta_{1a} = 60°;$ $\lambda_{1b}$=650 nm, $\theta_{1b}$=60°; and
Y (θ) designates luminous reflectance at an incident angle of θ, provided that:

$$\theta_2=5°; \text{ and}$$

$$\theta_3=60°.$$

2. The optical laminate according to claim 1, wherein the optical laminate further satisfies the following characteristic (iv):

$$0.3<R(\lambda_{2a},\theta_{2a})/R(\lambda_{2b},\theta_{2b})<1.3(\theta_{2a}=\theta_{2b}=5°); \quad \text{(iv)}$$

wherein $\lambda_{2a}$ is within a wavelength region of from 400 nm to 450 nm, and $\lambda_{2b}$ is within a wavelength region of from 700 nm to 790 nm.

3. The optical laminate according to claim 1, wherein the optical laminate further satisfies the following characteristic (v):

$$R(\lambda_{3a},\theta_{3a})<2\%; \quad \text{(v)}$$

wherein R (λ,θ) designates reflectance when light of a wavelength of λ nm is incident at an angle of θ, provided that $\lambda_{3a}$=500 nm, and $\theta_{3a}$=5°.

4. The optical laminate according to claim 1, wherein the optical laminate has a region satisfying T(850 nm,0°)>60% in a region where the light shielding film is provided, wherein T (850 nm, 0°) designates transmittance when light of a wavelength of 850 nm is incident at an angle of 0°.

5. The optical laminate according to claim 1, wherein:
the light shielding film comprises an infrared transmission region; and
the light shielding film is in contact with the base material and satisfies the following conditions (a) and (b):
(a) $0.8×n_B≤n_A≤1.2×n_B$ and $0.1×k_B≤k_A≤1.8×k_B$ at a wavelength of 450 to 650 nm; and
(b) $k_A≤0.2$ at a wavelength of 850 nm;
wherein
$n_A$ designates a refractive index of the light shielding film in contact with the base material in the infrared transmission region;
$k_A$ designates an extinction coefficient of the light shielding film in contact with the base material in the infrared transmission region;
$n_B$ designates a refractive index of the light shielding film in contact with the base material in a region other than the infrared transmission region; and
$k_B$ designates an extinction coefficient of the light shielding film in contact with the base material in a region other than the infrared transmission region.

6. The optical laminate according to claim 1, wherein the antireflection film comprises at least one layer containing a material whose refractive index is 1.2 to 1.60 with respect to light of a wavelength of 550 nm.

7. The optical laminate according to claim 1, wherein the antireflection film further comprises a material whose refractive index is 1.61 to 2.7 with respect to light of a wavelength of 550 nm.

8. The optical laminate according to claim 1, wherein the antireflection film comprises at least one kind of material selected from the group consisting of silicon oxide, magnesium fluoride, magnesium oxide, aluminum fluoride, and silicon oxynitride.

9. The optical laminate according to claim 1, wherein the antireflection film comprises at least one kind of material selected from the group consisting of niobium oxide, titanium oxide, zinc oxide, tin oxide, aluminum oxide, and silicon nitride.

10. The optical laminate according to claim 1, wherein the base material has a curved surface.

11. The optical laminate according to claim 1, wherein the light shielding film has a thickness of from 0.1 μm to 30 μm.

12. The optical laminate according to claim 1, wherein the light shielding film has a thickness of from 0.5 μm to 30 μm.

13. The optical laminate according to claim 1, wherein the light shielding film is formed by a process comprising applying an ink comprising a solvent in which the pigment and the photocurable resin and/or the thermosetting resin are dissolved onto the other surface of the base material, removing the solvent, and curing the photocurable resin and/or the thermosetting resin by light and/or heat.

14. The optical laminate according to claim 1, wherein the antireflection film has a thickness of 263 nm or less.

* * * * *